(12) United States Patent
Hwang et al.

(10) Patent No.: US 8,970,976 B1
(45) Date of Patent: Mar. 3, 2015

(54) SYSTEMS AND METHODS FOR DATA DEPENDENT INTER-TRACK INTERFERENCE CANCELLATION

(71) Applicant: LSI Corporation, San Jose, CA (US)

(72) Inventors: Eui Seok Hwang, San Jose, CA (US); Jongseung Park, Allentown, PA (US); Ivana Djurdjevic, San Jose, CA (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/062,808

(22) Filed: Oct. 24, 2013

Related U.S. Application Data

(60) Provisional application No. 61/894,385, filed on Oct. 22, 2013.

(51) Int. Cl.
*G11B 5/09* (2006.01)
*G11B 20/10* (2006.01)

(52) U.S. Cl.
CPC .................. *G11B 20/10268* (2013.01)
USPC .................... 360/39; 360/53; 360/55; 360/46

(58) Field of Classification Search
None
See application file for complete search history.

(56) References Cited

U.S. PATENT DOCUMENTS

| 8,250,434 | B2 | 8/2012 | Yang | |
|---|---|---|---|---|
| 8,659,847 | B1* | 2/2014 | Yeung et al. | 360/53 |
| 2008/0151704 | A1* | 6/2008 | Harada | 369/30.22 |
| 2012/0063022 | A1 | 3/2012 | Mathew | |
| 2012/0063024 | A1 | 3/2012 | Mathew | |
| 2012/0063284 | A1 | 3/2012 | Mathew | |

OTHER PUBLICATIONS

Cassuto et al, "Indirection Systems for Shingled-Recording Disk Drives" 26th IEEE Conference on Mass Storage Systems and Technologies (May 2010).
Gibson et al "Directions for Shingled-Write and Two-Dimensional Magnetic Recording System" Architectures: Synergies with Solid-State Disks Carnegie Mellon Univ. May 1, 2009.
U.S. Appl. No. 13/963,589, filed Aug. 9, 2013, Eui Seok Hwang, Unpublished.
U.S. Appl. No. 13/886,170, filed May 2, 2013, Lu Lu, Unpublished.
U.S. Appl. No. 13/777,915, filed Feb. 26, 2013, Jun Xiao, Unpublished.
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Muhammad N Edun
(74) *Attorney, Agent, or Firm* — Hamilton DeSanctis & Cha

(57) ABSTRACT

Systems, methods, devices, circuits for data processing, and more particularly to systems and methods for reducing inter-track interference in relation to processing data retrieved from a storage medium.

20 Claims, 4 Drawing Sheets

SYSTEMS AND METHODS FOR DATA DEPENDENT INTER-TRACK INTERFERENCE CANCELLATION

CROSS REFERENCE TO RELATED APPLICATIONS

The present application claims priority to (is a non-provisional of) U.S. Pat. App. No. 61/894,385, entitled "Systems and Methods for Data Dependent Inter-Track Interference Cancellation", and filed Oct. 22, 2013 by Hwang et al, the entirety of which is incorporated herein by reference for all purposes.

FIELD OF THE INVENTION

Various embodiments of the present invention provide systems and methods for data processing, and more particularly to systems and methods for data dependent inter-track interference cancellation in a data processing system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. However, as recording density is increased for greater storage capacity, inter-track interference is increased, distorting the data patterns recorded on the storage medium.

SUMMARY

Various embodiments of the present invention provide systems and methods for data processing, and more particularly to systems and methods for data dependent inter-track interference cancellation in a data processing system.

A data processing system is disclosed including a data dependent inter-track interference cancellation circuit, which is operable to calculate an estimated inter-track interference between an element of a first data set from a first location on a storage medium and one or more elements of a second data set from a second location on the storage medium. The estimated inter-track interference is based at least in part on a feedback derived from a decoded data set, and based at least in part on a first data pattern in the first data set and on a second data pattern in the second data set.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Embodiments of the present invention are related to systems and methods for data dependent inter-track interference cancellation in a magnetic storage system. In a magnetic storage system, high recording density leads to interference from one bit period location to another bit period location. Interference between bit periods in neighboring tracks is referred to herein as inter-track interference. The level of inter-track interference is estimated by correlating a read back signal from the track being processed with a representation of data in at least one adjacent track, also referred to as a side track. This estimate is used to generate an inter-track interference cancellation signal which can be used to cancel the inter-track interference in the read back signal.

In some embodiments, a data-dependent inter-track interference adjustment coefficient $\beta$ is generated based on the data pattern in the read back signal and on the data pattern in at least one side track. The inter-track interference cancellation signal is scaled by the adjustment coefficient $\beta$ to adapt for the data dependency of the inter-track interference. In some embodiments, the data-dependent inter-track interference adjustment coefficient $\beta$ is generated based on the values or pattern of the current three bits of the read back signal from the target data track, and of the closest two bits of the next data track. The scaled inter-track interference cancellation signal is then subtracted from the read back signal, yielding a corrected read back signal. Thus, in general, a data dependent inter-track interference cancellation circuit is operable to calculate an estimated inter-track interference between an element of a first data set from a first location on a storage medium and one or more elements of a second data set from a second location on the storage medium, based at least in part on a feedback derived from a decoded data set, and based at least in part on a data pattern in the first data set and on a data pattern in the second data set.

By reweighting the inter-track interference cancellation signal based on the local data patterns before subtracting from the read back signal, the residual inter-track interference is reduced and the bit error rate performance can be improved. In some other embodiments, a set of inter-track interference cancellation signals is estimated for different data patterns in the target track and side track. In some embodiments, fractional phase offsets between written tracks are also considered when generating the data-dependent inter-track interference adjustment coefficient β or when generating the set of inter-track interference cancellation signals, weighting the effect of side track bits on target track bits based on the fractional phase offset between tracks.

Figure 1:
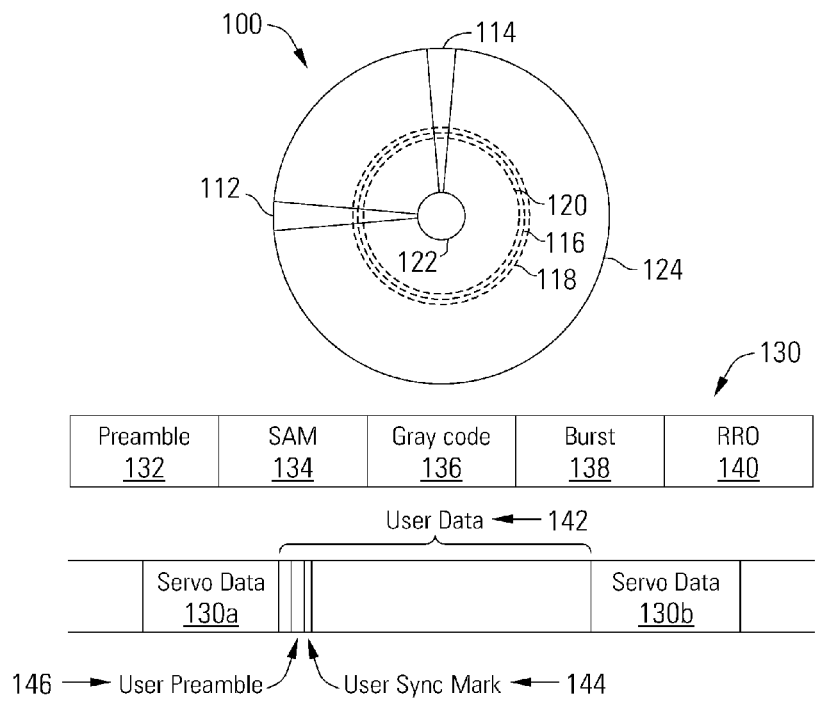
FIG. 1 is a diagram of a magnetic storage medium and sector data scheme which can be used with data dependent inter-track interference cancellation in accordance with some embodiments of the present invention.

Turning to FIG. 1, a magnetic storage medium 100 with an example target data track 116 and its two adjacent data tracks 118, 120 are shown, indicated as dashed lines. In some embodiments, the level of inter-track interference is estimated by correlating a read back signal from the target data track 116 with a representation of data in the next side track 118. This estimate is used to generate an inter-track interference cancellation signal which can be used to cancel the inter-track interference in the read back signal. A data-dependent inter-track interference adjustment coefficient β is generated based on the pattern of the current three bits of the read back signal from the target data track 116, and of the closest two bits of the side track 118. The inter-track interference cancellation signal is scaled by adjustment coefficient β before subtracting it from the read back signal to cancel the interference. In some other embodiments, both side tracks 118, 120 are used in generating the adjustment coefficient β and/or generating the inter-track interference cancellation signal.

The tracks 116, 118, 120 are segregated by servo data written within wedges servo 112, 114. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. A servo data set may have two or more fields of burst information, and different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. As user data is read, the data dependent inter-track interference cancellation operation is performed. In a write operation, the sensor would sense servo data from wedge 112 then write data to the user data region between wedge 112 and wedge 114, with location information in the user data region provided by a user sync mark 144 and a user preamble 146.

Figure 2:
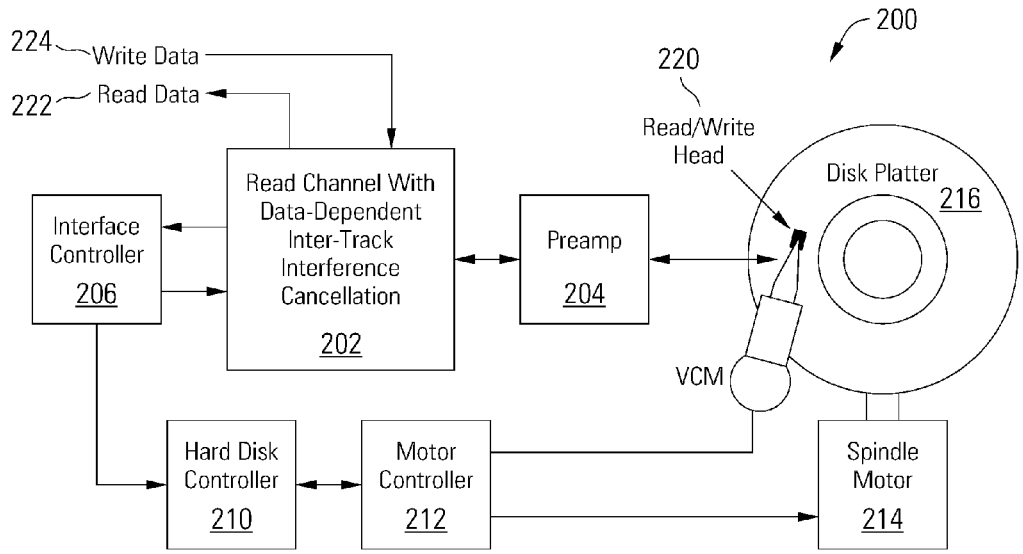
FIG. 2 depicts a storage system including a read channel with data dependent inter-track interference cancellation in accordance with some embodiments of the present invention.

Turning to FIG. 2, a storage system 200 is disclosed which includes a read channel circuit 202 which performs data dependent inter-track interference cancellation as user data is read in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes, cancels data dependent inter-track interference, and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. The data dependent inter-track interference cancellation can be implemented consistent with that disclosed in relation to FIG. 6. In some cases, methods of cancelling data dependent inter-track interference can be performed consistent with the flow diagrams disclosed in relation to FIGS. 7-8.

It should be noted that storage system 200 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 can be modified to include solid state memory that is used to store data in addition to the storage offered by disk platter 216. This solid state memory can be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory can be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
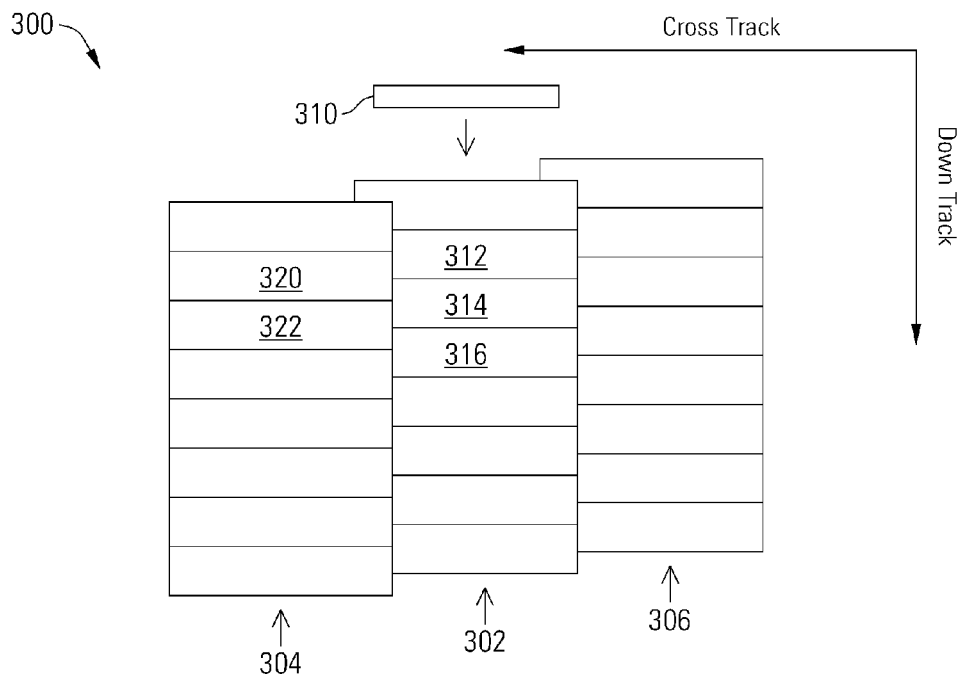
FIG. 3 depicts a pattern of bit periods stored on a magnetic storage medium in three adjacent data tracks in accordance with some embodiments of the present invention.

Turning to FIG. 3, a pattern 300 of bit periods stored on a magnetic storage medium in three adjacent data tracks is depicted in accordance with some embodiments of the present invention. A read head 310 passes over a target data track 302, generating an analog signal representing magnetically recorded data bits 312, 314, 316 and so on. Notably, target data track overlaps previous data track 306 and next data track 304, also referred to herein as the side track. In some embodiments, the most recently written data track will affect or overlap both its adjacent data tracks. When cancelling the inter-track interference for bit 314, the interference is based at least in part on the value of bit 314, its preceding and following bits 312, 316, and on the data pattern in side track bits 320, 322 which are near bit 314. The data dependent inter-track interference thus considers the data pattern in bits 312, 314, 316 and side track bits 320, 322 when cancelling the inter-track interference of bit 314.

In some embodiments, the phase offset between data tracks 304 and 302 is also considered when cancelling the data dependent inter-track interference. For example, if bit 320 is closer than bit 322 to bit 314, bit 320 will have more effect on the data dependent inter-track interference to bit 314 than bit 322.

Figure 4:
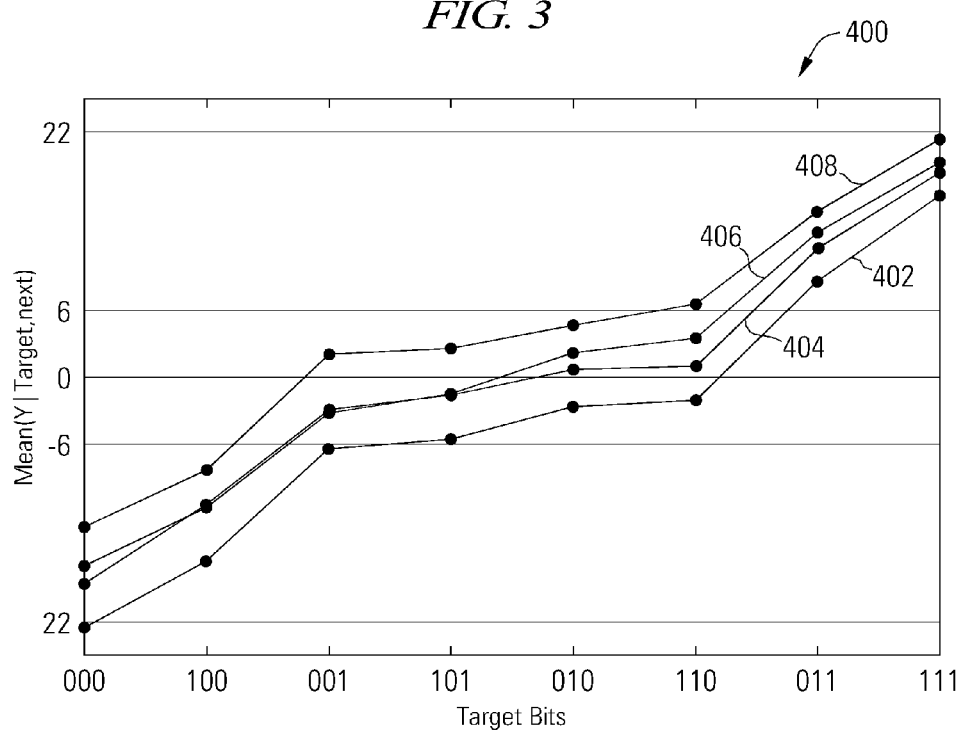
FIG. 4 is a graph of the mean of equalized data from the read back signal for different triplet data patterns, plotted for each of four side track data patterns in accordance with some embodiments of the present invention.

Turning to FIG. 4, graph 400 depicts the mean of equalized data from the read back signal for different triplet data patterns, plotted as they occur with each of four side track data patterns in accordance with some embodiments of the present invention. The Y axis corresponds to the mean value of equalized Y samples for the read back signal, the X axis to the different data patterns in read back signal triplets of three bits. In this example, the partial response target is [8 14], so the expected mean value of equalized Y samples are −22, −22, −6, −6, 6, 6, 22, and 22 from the three bit target track data patterns. As shown by graph 400, the different side track data patterns ("00", "01", "10", "11") result in different inter-track interference impacts on the target data track bits, with the impact of side track data pattern "00" shown in plot line 402, data pattern "10" in plot line 404, data pattern "01" in plot line 406, and data pattern "11" in plot line 408. The gap in the mean of the data dependent equalized Y samples between a side track data pattern of "00" and a side track data pattern of "11" is 9.1 for target data pattern "000", 8.5 for target data pattern "001", 8.6 for target data pattern "110", and 4.9 for target data pattern "111", for an inter-track interference strength variation of up to about 30% based on side track data pattern. This variation of inter-track interference strength can be mitigated by the data dependent inter-track interference cancellation disclosed herein.

Figure 5:
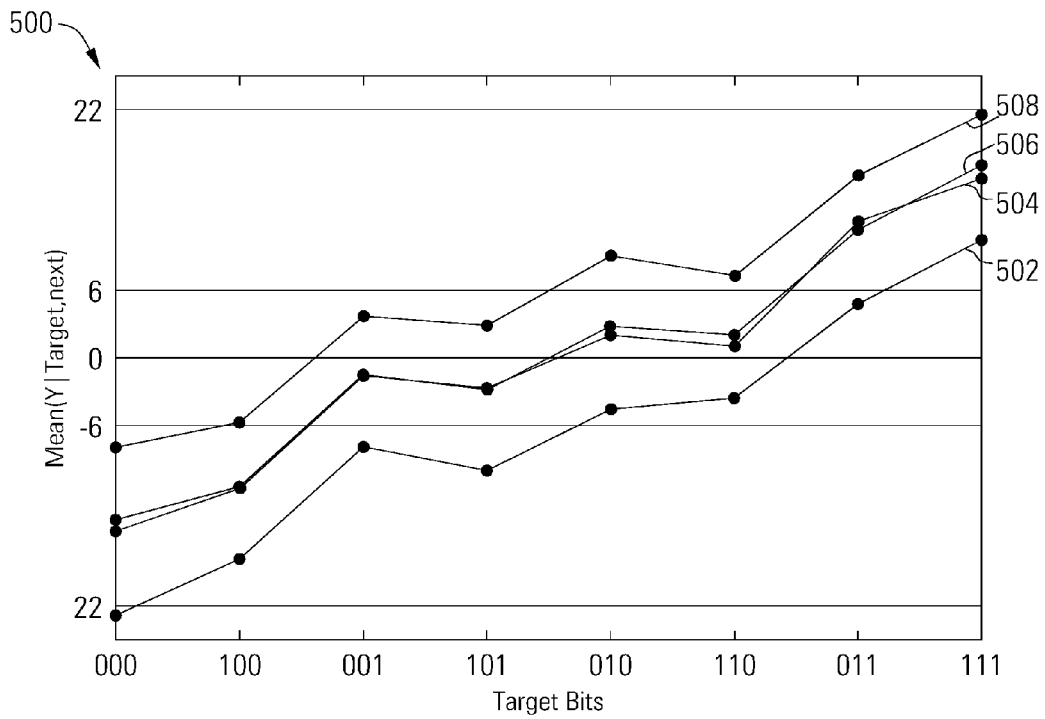
FIG. 5 is a graph of the mean of equalized data from the read back signal for different triplet data patterns, plotted for each of four side track data patterns, with a different cross-track squeeze than in FIG. 4, in accordance with some embodiments of the present invention.

Turning to FIG. 5, graph 500 depicts the mean of equalized data from the read back signal for different triplet data patterns, read with an increased squeeze, and plotted as they occur with each of four side track data patterns in accordance with some embodiments of the present invention. The Y axis corresponds to the mean value of equalized Y samples for the read back signal, the X axis to the different data patterns in read back signal triplets of three bits. As shown by graph 500, the different side track data patterns ("00", "01", "10", "11") result in different inter-track interference impacts on the target data track bits, with the impact of side track data pattern "00" shown in plot line 502, data pattern "10" in plot line 504, data pattern "01" in plot line 506, and data pattern "11" in plot line 508. The gap in the mean of the data dependent equalized Y samples between a side track data pattern of "00" and a side track data pattern of "11" is 14.9 for target data pattern "000", 11.5 for target data pattern "001", 10.9 for target data pattern "110", and 11.0 for target data pattern "111", for an inter-track interference strength variation of up to about 15.5% based on side track data pattern. This variation of inter-track interference strength can be mitigated by the data dependent inter-track interference cancellation disclosed herein.

Figure 6:
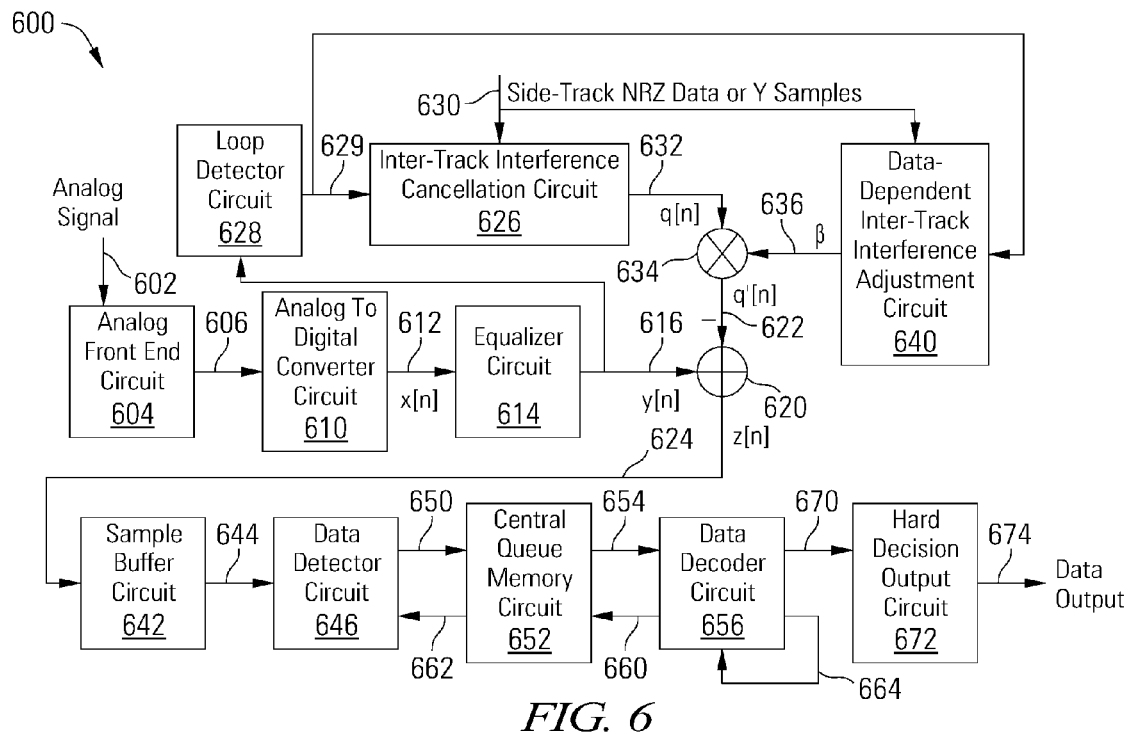
FIG. 6 depicts a data processing system with data dependent inter-track interference cancellation in accordance with some embodiments of the present invention.

Turning to FIG. 6, a data processing system 600 with data dependent inter-track interference cancellation is depicted in accordance with some embodiments of the present invention. Data processing system 600 includes an analog front end circuit 604 that receives an analog signal 602. Analog front end circuit 604 processes analog signal 602 and provides a processed analog signal 606 to an analog to digital converter circuit 610. Analog front end circuit 604 may include, but is not limited to, an analog filter and an amplifier circuit as are known in the art. Based upon the disclosure provided herein, one of ordinary skill in the art will recognize a variety of circuitry that may be included as part of analog front end circuit 604. In some embodiments, analog input signal 602 is derived from a read/write head assembly that is disposed in relation to a magnetic storage medium.

Analog to digital converter circuit 610 converts processed analog signal 606 into a corresponding series of digital samples 612 x[n]. Digital samples 612 (and signals derived therefrom) prior to being processed by an equalizer circuit 614 are considered X samples. Analog to digital converter circuit 610 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 612 are provided to an equalizer circuit 614. Equalizer circuit 614 applies an equalization algorithm to digital samples 612 to yield an equalized output 616 y[n]. In some embodiments of the present invention, equalizer circuit 614 is a digital finite impulse response filter circuit as are known in the art. Equalized output 616 (and signals derived therefrom) after being processed by equalizer circuit 614 contains digital samples which are considered Y samples.

Equalized output 616 is provided to a subtraction circuit 620 which subtracts a data-dependent inter-track interference cancellation signal 622 q'[n] from equalized output 616, yielding cleaned samples 624 z[n]. An inter-track interference cancellation circuit 626 estimates inter-track interference in the equalized output 616 by correlating the read back signal from the track being processed with a representation of data in the side track, yielding inter-track interference cancellation signal 632 q[n]. In some embodiments, the read back signal is represented in inter-track interference cancellation circuit 626 by a detected output 629 from a loop detector circuit 628. The loop detector circuit 628 is a circuit that is capable of producing a detected output 629 by applying a data detection algorithm to Y samples (e.g., 616) to return a representation of the data from which analog signal 602 was derived. The data detection algorithm applied by the loop detector circuit 628 may be, but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. In some embodiments, loop detector circuit 628 is operable to determine timing feedback and other operations designed to align the sampling of analog to digital converter circuit 610 with the received data set, and/or to adjust a gain applied by analog front end circuit 604.

In some embodiments, the representation of data in the side track is provided in inter-track interference cancellation circuit 626 by side track non-return to zero (NRZ) data 630 such as a detected output or hard decisions based on a signal read from the side track. In some other embodiments, the representation of data in the side track is provided in inter-track interference cancellation circuit 626 by equalized Y-samples based on a signal read from the side track. The inter-track interference can be calculated consistent with the disclosure of U.S. patent application Ser. No. 13/618,317 entitled "Systems and Methods for Hard Decision Based ITI Cancellation", and filed by Xiao et al. on Sep. 14, 2012. The entirety of the aforementioned reference is incorporated herein by reference for all purposes. In some embodiments, the inter-track interference cancellation signal 632 q[n] is calculated based in part on an average over n samples, such as, but not limited to, 5000 samples, of an inter-track interference coefficient multiplied by side track data. Because of the averaging, the data dependence is not considered in some embodiments of the inter-track interference cancellation circuit 626. In other embodiments, the inter-track interference cancellation circuit 626 does compensate for data dependence of inter-track interference by considering the data patterns in the target data track and side track.

In some embodiments, a data dependent inter-track interference adjustment circuit 640 generates a data-dependent inter-track interference adjustment coefficient β 636 based on the pattern of the current three bits of the read back signal from the target data track, and of the closest two bits of the side track. In some embodiments, the data dependent inter-track interference adjustment circuit 640 comprises a lookup table with scaling factors for each combination of the different data patterns possible in the current three bits of the target data track, provided as detected output 629, and on the closest two bits of the side track, provided as side track NRZ data or Y-samples 630. (In some embodiments, hard decisions 670 are used in place of detected output 629 to indicate the data pattern in the current three bits of the target data track to the data dependent inter-track interference adjustment circuit 640.) The values for the scaling factors for each combination of the different data patterns possible in the current three bits of the target data track and the closest two bits of the side track are pre-computed, based on a determination of the effect of each data pattern on the inter-track interference. Such a determination is made, in some embodiments, by considering the mean of equalized output 616 for the different data patterns as shown in FIGS. 4 and 5 for the particular data processing system. Test data with different data patterns can be used in a particular data processing system to determine the different impacts on inter-track interference in the system of each combination of data patterns, yielding different scaling values for each combination of data patterns that compensate for the difference on the impact from the averaged inter-track interference cancellation signal 632 q[n]. Based upon the disclosure provided herein, one of ordinary skill in the art will recognize a variety of techniques that can be used to generate the scaling values, and a variety of circuitry that may be included as part of data dependent inter-track interference adjustment circuit 640 to retrieve the scaling values based on the current data patterns.

A multiplier 634 multiplies the inter-track interference cancellation signal 632 q[n] by the data-dependent inter-track interference adjustment coefficient β 636 to yield the data-dependent inter-track interference cancellation signal 622 q'[n]. In other embodiments, the inter-track interference cancellation circuit 626 compensates for data dependency such that the inter-track interference cancellation signal 632 q[n] can be subtracted directly from equalized output 616 y[n] in subtraction circuit 620.

Cleaned data samples 624 are written to sample buffer circuit 642 where it can then be provided as buffered data 644 for subsequent iterations through backend data detector circuit 646 and data decoder circuit 656. Sample buffer circuit 642 includes sufficient memory to maintain one or more codewords until processing of that codeword is completed through data detector circuit 646 and data decoder circuit 656 including, where warranted, multiple "global iterations" defined as passes through both data detector circuit 646 and data decoder circuit 656 and/or "local iterations" defined as passes through data decoding circuit 656 during a given global iteration.

The buffered data 644 from sample buffer circuit 642 are provided to data detector circuit 646 which yields detected output 650. Data detector circuit 646 is a data detector circuit capable of producing detected output 650 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Loop detector circuit 628 and data detector circuit 646 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 650 is provided to a central queue memory circuit 652 that operates to buffer data passed between data detector circuit 646 and data decoder circuit 656. When data decoder circuit 656 is available, data decoder circuit 656 receives detected output 650 from central queue memory 652 as a decoder input 654. Data decoder circuit 656 applies a data decoding algorithm to decoder input 654 in an attempt to recover originally written data. The result of the data decoding algorithm is provided as a decoded output 660. Similar to detected output 650, decoded output 660 can include both hard decisions and soft decisions. Data decoder circuit 656 can be any data decoder circuit known in the art that is capable of applying a decoding algorithm to a received input. Data decoder circuit 656 can be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 656 provides the result of the data decoding algorithm as a data output 670. Data output 670 is provided to a hard decision output circuit 672 where the data is reordered before providing a series of ordered data sets as a data output 674.

One or more iterations through the combination of data detector circuit 646 and data decoder circuit 656 can be made in an effort to converge on the originally written data set. As mentioned above, processing through both the data detector circuit and the data decoder circuit is referred to as a "global iteration". For the first global iteration, data detector circuit 646 applies the data detection algorithm without guidance from a decoded output. For subsequent global iterations, data detector circuit 646 applies the data detection algorithm to buffered data 644 as guided by decoded output 660. Decoded output 660 is received from central queue memory 652 as a detector input 662.

During each global iteration it is possible for data decoder circuit 656 to make one or more local iterations including application of the data decoding algorithm to decoder input 654. For the first local iteration, data decoder circuit 656 applies the data decoder algorithm without guidance from a decoded output 664. For subsequent local iterations, data decoder circuit 656 applies the data decoding algorithm to decoder input 654 as guided by a previous decoded output 664. In some embodiments of the present invention, a default of ten local iterations is allowed for each global iteration.

Figure 7:
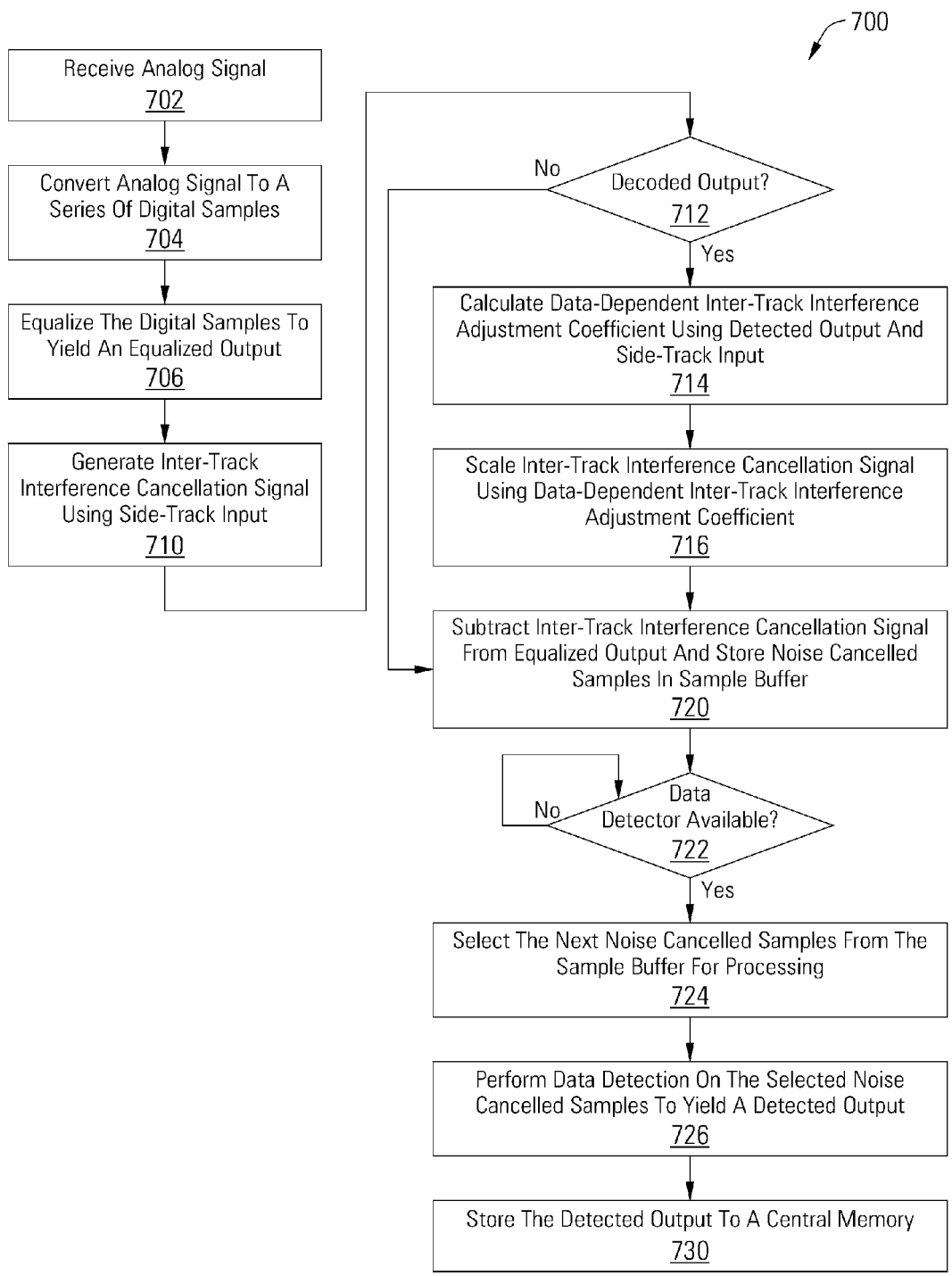
FIG. 7 is a flow diagram showing a method of detecting data while processing data and performing data dependent inter-track interference cancellation in accordance with some embodiments of the present invention.

Turning to FIG. 7, a flow diagram 700 discloses a method in accordance with various embodiments of the present invention for processing data with data dependent inter-track interference cancellation. Following flow diagram 700, an analog input is received (block 702). The analog input may be derived from, for example, a storage medium or a data transmission channel. Based upon the disclosure provided herein, one of ordinary skill in the art will recognize a variety of sources of the analog input. The analog input is converted to a series of digital samples (block 704). This conversion can be done using an analog to digital converter circuit or system as are known in the art. Of note, any circuit known in the art that is capable of converting an analog signal into a series of digital values representing the received analog signal can be used. The resulting digital samples are equalized to yield an initial equalized output (block 706). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

An inter-track interference cancellation signal is generated using at least a side-track input (block 710). The inter-track interference cancellation signal is generated by estimating the level of inter-track interference. In some embodiments, this is achieved by correlating a read back signal from the track being processed with a representation of data in at least one side track.

It is determined whether a detected output is available for the data being processed (block 712). If not, the inter-track interference cancellation signal is subtracted from the equalized output, yielding noise cancelled or cleaned samples, which are stored in a sample buffer (block 720). If a detected output is available (block 712), a data dependent inter-track interference adjustment coefficient $\beta$ is calculated using the detected output and a side track input (block 714). The data-dependent inter-track interference adjustment coefficient $\beta$ is generated in some embodiments based on the values or pattern of the current three bits of the read back signal from the target data track, and of the closest two bits of the next data track. The inter-track interference cancellation signal is scaled by the adjustment coefficient $\beta$ to adapt for the data dependency of the inter-track interference (block 716). The inter-track interference cancellation signal, as scaled, is subtracted from the equalized output, yielding noise cancelled or cleaned samples, which are stored in a sample buffer (block 720).

It is determined whether a data detector circuit is available (block 722). Where the data detector circuit is available (block 722), the next equalized output from the sample buffer is selected for processing (block 724), and a data detection is performed on the selected equalized output to yield a detected output (block 726). The data detection can be, but is not limited to, a Viterbi algorithm data detection or a maximum a posteriori data detection. Based upon the disclosure provided herein, one of ordinary skill in the art will recognize other data detection algorithms that can be used in relation to different embodiments of the present invention. The detected output is then stored to a central memory where it awaits the availability of a downstream data decoder circuit (block 730).

By reweighting the inter-track interference cancellation signal based on the local data patterns before subtracting from the read back signal, the residual inter-track interference is reduced and the bit error rate performance can be improved. In some other embodiments, a set of inter-track interference cancellation signals is estimated for different data patterns in the target track and side track. In some embodiments, fractional phase offsets between written tracks are also considered when generating the data-dependent inter-track interference adjustment coefficient $\beta$ or when generating the set of inter-track interference cancellation signals, weighting the effect of side track bits on target track bits based on the fractional phase offset between tracks.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for data dependent inter-track interference cancellation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
a data dependent inter-track interference cancellation circuit comprising:
a loop detector operable to apply a data detection algorithm to a data input to yield a detected output;
an inter-track interference cancellation circuit comprising a first side-track data input, a first detected data input connected to the detected output; and an inter-track interference cancellation signal output; and
a data-dependent inter-track interference adjustment circuit comprising a second side-track data input, a second detected data input connected to the detected output, and an adjustment coefficient output, wherein the data-dependent inter-track interference adjustment circuit is operable to calculate an adjustment coefficient for an estimated inter-track interference between an element of a first data set at the second detected data input and a second data set at the second side-track data input, based at least in part on data patterns in the first data set and in the second data set, wherein the data dependent inter-track interference cancellation circuit is operable to yield cleaned samples based at least in part on the data input, on the inter-track interference cancellation signal output and on the estimated inter-track interference.

2. The data processing system of claim 1, wherein the data pattern in the first data set comprises a three bit data pattern with the element of the first data set in a middle position of the three bit data pattern.

3. The data processing system of claim 1, wherein the data pattern in the second data set comprises a two bit data pattern.

4. The data processing system of claim 3, wherein the two bit data pattern is located in a pair of bits closest to the element of the first data set.

5. The data processing system of claim 1, wherein the first data set is obtained from a first data track and wherein the second data set is obtained from a second data track adjacent the first data track.

6. The data processing system of claim 1, wherein the data dependent inter-track interference cancellation circuit is operable to scale an inter-track interference cancellation signal at the inter-track interference cancellation signal output by the adjustment coefficient.

7. The data processing system of claim 6, wherein the data-dependent inter-track interference adjustment circuit comprises a lookup table operable to retrieve the adjustment coefficient based on the data patterns in the first data set and in the second data set.

8. The data processing system of claim 7, wherein the lookup table is further operable to retrieve the adjustment coefficient based at least in part on a phase offset between the data patterns in the first data set and in the second data set.

9. The data processing system of claim 6, wherein the data dependent inter-track interference cancellation circuit further comprises a subtraction circuit operable to subtract the scaled inter-track interference cancellation signal from the data input.

10. The data processing system of claim 1, further comprising:
a data detector circuit operable to apply a data detection algorithm to the cleaned samples to yield a second detected output; and
a data decoder circuit operable to apply a data decoding algorithm to the second detected output to yield a decoded data set.

11. The data processing system of claim 10, wherein the data detector circuit is selected from a group consisting of: a maximum a posteriori data detector circuit, and a Viterbi algorithm data detector circuit.

12. The data processing system of claim 10, wherein the data decoder circuit comprises a low density parity check decoder circuit.

13. The data processing system of claim 10, further comprising an equalizer circuit operable to equalize a sample set to yield the data input.

14. The data processing system of claim 1, wherein the system is implemented as part of an integrated circuit.

15. The data processing system of claim 1, wherein the system is incorporated in a hard disk drive.

16. A method for canceling inter-track interference, the method comprising:
receiving a first data set derived from a selected track on a storage medium;
receiving a second data set derived from a track adjacent to the selected track on the storage medium, wherein the second data set has been processed through a data detector circuit and a data decoder circuit;
applying a data detection algorithm to a detector input derived from the first data set by the data detector circuit to yield a detected output; and
calculating a data dependent inter-track interference based at least upon the second data set and the detected output, and upon data patterns in the first data set and second data set.

17. The method of claim 16, wherein calculating the data dependent inter-track interference comprises generating an inter-track interference adjustment coefficient based upon a three bit data pattern centered on a current bit in the first data set and upon a two bit data pattern in the second data set and closest on the storage medium to the current bit.

18. The method of claim 16, further comprising subtracting the data dependent inter-track interference from the first data set to yield the detector input.

19. A data storage device, comprising:
a storage medium;
a read/write head assembly disposed in relation to the storage medium;
an analog to digital converter circuit operable to convert an information set from a first data track on the storage medium via the read/write head assembly into a sample set;
a read channel circuit including:
an equalizer circuit operable to equalize the sample set to yield a data input;
a data detector circuit operable to apply a data detection algorithm to a detector input derived from the data input to yield a detected output; and
a data dependent inter-track interference cancellation circuit operable to calculate an estimated inter-track interference between an element of the data input and one or more elements of a second data set read from a second data track on the storage medium adjacent the first data track, based at least in part on a first data pattern in the detected output and on a second data pattern in the second data set.

20. The data storage device of claim 19, wherein the first data pattern comprises a three bit data pattern with the element of the data input in a middle position of the three bit data pattern, and wherein the second data pattern comprises a two bit data pattern located on the storage medium in a pair of bits closest to the element of the data input.

* * * * *